United States Patent
Flaig et al.

(10) Patent No.: US 11,237,027 B2
(45) Date of Patent: Feb. 1, 2022

(54) ROTARY ENCODER COMPRISING AN ELASTIC ELEMENT FOR ATTACHING A CODE DISK

(71) Applicant: FRUITCORE ROBOTICS GMBH, Constance (DE)

(72) Inventors: Adrian Flaig, Constance (DE); Manuel Tobias Frey, Constance (DE); Jens Robert Riegger, Constance (DE); Tobias Kuentzle, Karlsruhe (DE); Johannes Füssl, Constance (DE)

(73) Assignee: FRUITCORE ROBOTICS GMBH, Constance (DE)

( * ) Notice: Subject to any disclaimer, the term of this patent is extended or adjusted under 35 U.S.C. 154(b) by 0 days.

(21) Appl. No.: 17/273,897

(22) PCT Filed: Sep. 6, 2019

(86) PCT No.: PCT/EP2019/073903
§ 371 (c)(1),
(2) Date: Mar. 5, 2021

(87) PCT Pub. No.: WO2020/049179
PCT Pub. Date: Mar. 12, 2020

(65) Prior Publication Data
US 2021/0247217 A1    Aug. 12, 2021

(30) Foreign Application Priority Data
Sep. 7, 2018 (EP) .................................... 18193173

(51) Int. Cl.
*G01D 11/02* (2006.01)
*G01D 5/00* (2006.01)
*G01D 11/24* (2006.01)

(52) U.S. Cl.
CPC ............... *G01D 11/02* (2013.01); *G01D 5/00* (2013.01); *G01D 11/24* (2013.01)

(58) Field of Classification Search
CPC ........... G01D 11/02; G01D 5/00; G01D 11/24
See application file for complete search history.

(56) References Cited

U.S. PATENT DOCUMENTS

| | | | |
|---|---|---|---|
| 5,045,691 A | 9/1991 | Steward et al. | |
| 6,166,374 A | 12/2000 | Snyder | |

(Continued)

FOREIGN PATENT DOCUMENTS

| | | | |
|---|---|---|---|
| CN | 201662453 U | * | 12/2010 |
| CN | 211147697 U | * | 7/2020 |

(Continued)

OTHER PUBLICATIONS

International Search Report and Written Opinion, dated Nov. 12, 2019, in corresponding International Application No. PCT/EP2019/073903, with machine English translation (15 pages).

(Continued)

*Primary Examiner* — Jamel E Williams
(74) *Attorney, Agent, or Firm* — Fitch, Even, Tabin & Flannery LLP (57) ABSTRACT

A rotary encoder (1) comprising a housing (2), a shaft (3), a code disk (4) which is attached to the shaft (3), and a reading head (5) which is designed to detect the rotation of the code disk (4) are disclosed herein. The code disk (4) is affixed in the axial position thereof on an axial side by way of an abutment (6), and a resilient element (7, 17, 19) is arranged on the other axial side providing a clamping force for pressing the code disk (4) against the abutment (6). A method for assembling a rotary encoder is also disclosed herein.

14 Claims, 3 Drawing Sheets

(56) References Cited

U.S. PATENT DOCUMENTS

| | | | | |
|---|---|---|---|---|
| 6,704,272 | B1* | 3/2004 | Hagiwara | G11B 17/038 369/269 |
| 7,429,073 | B2* | 9/2008 | Watanabe | E05F 15/63 296/146.4 |
| 7,569,808 | B2* | 8/2009 | Yoshioka | G01D 5/34738 250/231.14 |
| 8,495,820 | B2* | 7/2013 | Maric | G01D 11/245 33/1 N |
| 2005/0092905 | A1* | 5/2005 | Kawai | G01D 5/34738 250/231.13 |
| 2006/0208173 | A1* | 9/2006 | Nakamura | G01D 5/145 250/231.13 |
| 2008/0144019 | A1* | 6/2008 | Nakamura | G01D 5/34738 356/138 |
| 2009/0151260 | A1* | 6/2009 | Watanabe | G01P 13/04 49/324 |

FOREIGN PATENT DOCUMENTS

| | | | |
|---|---|---|---|
| DE | 19739012 | A1 | 3/1999 |
| DE | 102004022770 | A1 | 12/2005 |
| DE | 102005063428 | B4 | 7/2010 |
| EP | 1517121 | A2 | 3/2005 |
| JP | 2005320785 | A * | 11/2005 |
| JP | 2005320785 | A | 11/2005 |

OTHER PUBLICATIONS

Extended European Search Report and Written Opinion dated Feb. 22, 2019, in corresponding European Application No. 18193173.4, with machine English translation (18 pages).

International Preliminary Report on Patentability dated Mar. 9, 2021, in corresponding International Application No. PCT/EP2019/073903 (6 pages).

* cited by examiner

ROTARY ENCODER COMPRISING AN ELASTIC ELEMENT FOR ATTACHING A CODE DISK

CROSS REFERENCE TO RELATED APPLICATIONS

This patent application is the national phase of PCT/EP2019/073903, filed Sep. 6, 2019, which claims the benefit of European Patent Application No. 18193173.4, filed Sep. 7, 2018.

TECHNICAL FIELD

The present invention relates to a rotary encoder comprising a housing, a shaft, and a code disk which is attached on the shaft, as well as furthermore to a reading head which is designed to detect the rotation of the code disk. The invention further relates to a method for assembling a rotary encoder.

BACKGROUND

Known rotary encoders comprise, as central elements, a reading head and a code disk that rotates with a shaft, the rotation of which is to be detected relative to the reading head. It is crucial that the code disk rotate in an exact position relative to the reading head, where both the position of the code disk as well as its concentricity on the shaft is to be ensured.

It is known from U.S. Pat. No. 6,166,374 that a code disk is pressed downwardly during assembly by an element mounted in the rotary encoder cover, so that the reticle is moved to a desired position which is determined by the element contacting abutments. The element is then again removed from contacting the reticle.

It is known in prior art in particular to attach the code disk relative to a shoulder in the shaft by screwing it on or adhesively bonding it. For example, U.S. Pat. No. 5,045,691 discloses that a code disk in the form of a reticle is attached between flat washers by way of a nut on a shaft projection.

Attachment by screwing is disadvantageous, however, since screwing is relatively complex and requires additional installation space.

Attachment by adhesive bonding, on the other hand, can have a negative effect on the precision of the positioning of the code disk, since the position of the disk can vary depending on the amount of adhesive applied. There is also a risk of contamination from the adhesive. In addition, a certain curing time must be observed during the curing process and a very precise contact pressure must be applied, which renders the assembly process significantly more complex.

In prior art, rotary encoders closed by a housing often have a relatively large height in the axial direction and are therefore difficult to use with little installation space. For this reason, open rotary encoders are often used which are delivered without a housing, but are extremely difficult to install as the code disk can be easily damaged or installed incorrectly.

SUMMARY

The object of the present invention is to provide a rotary encoder that is easy to assemble and yet precise and operationally reliable.

According to the invention, a rotary encoder is provided comprising a housing, a shaft, a code disk which is attached on the shaft, and a reading head, where the latter is designed to detect the rotation of the code disk. The code disk is affixed in its axial position on one axial side by an abutment, where a resilient element is arranged on the other axial side of the rotary disk and provides a clamping force with which the code disk is pressed against the abutment.

The abutment defines the position of the code disk in the axial direction and the resilient element provides the necessary holding force so that the code disk is held on the abutment in the axial direction.

The code disk is therefore mounted between the abutment which is in particular fixedly mounted being defined in its position relative to the shaft and the resilient element.

The rotary encoder according to the invention can be installed with fewer working steps by clamping the code disk, but at the same time enables the code disk to be attached on the shaft in a manner that is precise and operationally reliable. Additional attachments such as screwing or adhesive bonding can be dispensed with. As the code disk abuts directly against the abutment, very precise positioning of the code disk can be achieved.

The axial holding force can also cause in particular a frictional engagement or a positive fit in the circumferential direction and/or the radial direction between the code disk and the abutment so that the position of the code disk can also be affixed in these directions.

As an alternative or in addition, it is possible to provide a positive fit in the radial direction and/or circumferential direction between the code disk and the abutment, for example, by complementary elements on the abutment and the code disk which are inserted into one another. For example, elevations or pins can be provided on the abutment which engage in openings in the code disk.

The code disk can be provided with optical code elements or magnetic code elements, where the reading head is adapted accordingly. The optical code elements are provided in particular on the upper side and/or the underside of the code disk. The reading head is then advantageously arranged in a U-shape from the side above and below the code disk. The magnetic code elements can alternatively be provided only along the outer circumference of the code disk. The reading head can then be arranged in the radial direction adjoining to the code disk.

The code disk is, in particular, a reticle on which several lines extending in the radial direction are provided along the circumference and can be detected by an optical reading head. Alternatively, magnetic lines can be provided. In any case, the reading head can detect the code elements when they are moved past it and thus determine the rotation of the shaft relative to the reading head or the housing, depending on the resolution of the code elements. The resolution is determined by the number of code elements applied to the code disk in the circumferential direction. The reading head is attached in particular in the housing. Alternatively, the reading head can also be arranged and attached on the outside of the housing or independently of the housing in a predetermined position relative to the housing. For example, the reading head and the housing can be arranged and attached on a common base plate or attachment surface. The reading head comprises in particular a sensor element, a printed circuit board, and microelectronics for evaluating the measured values of the sensor element.

The resilient element has in particular an inner diameter between 5 mm and 250 mm, advantageously between 10 mm and 100 mm, further advantageously between 20 mm and 50 mm. Depending on the application, however, much larger or smaller inner diameters of the resilient element can also be provided. For the aforementioned diameters, the thickness of the resilient element in the axial direction is in particular between 0.3 mm and 20 mm, advantageously between 0.5 mm and 3 mm, depending on the material of the resilient element. For other diameters of the resilient element, the thickness of the resilient element is adapted in particular proportionally.

In particular, the resilient element installed is compressed by at least 5%, advantageously it is compressed by at least 25%, in other embodiments even compressed by at least 40% or at least 70%. The Shore hardness of the resilient element is in particular between 30 and 90 Shore HSc, HSd, advantageously around 65 to 75 Shore HSc, HSd, and in one embodiment around 70 Shore HSc, HSd.

The abutment for the code disk can also be provided by a flat face side of the shaft. The code disk is then advantageously clamped between an axial bearing and the face side of the shaft.

The resilient element can be arranged either directly on the code disk or at a distance from it. In the latter configuration, other rigid or incompressible elements which can be displaced in the axial direction can be provided between the resilient element and the code disk.

In a preferred embodiment, the resilient element extends in the circumferential direction around the shaft. Uniform distribution of the clamping force can then be achieved. In other embodiments, however, it is also possible that several resilient elements are provided which are provided independently and at a distance from one another in the circumferential direction. For example, several small compression springs can be distributed around the circumference. They are advantageously arranged at regular intervals in order to provide a uniform clamping force A first bearing of the shaft is advantageously arranged such that the clamping force is introduced into the housing via the resilient element and the first bearing. In particular, the axial preload force of the first bearing is provided by the resilient element and is consequently also used as a clamping force for the code disk. The resilient element therefore not only provides the necessary clamping force, but also enables tolerance compensation with regard to the bearing preload. The code disk is then clamped between the inner race of the first bearing and the abutment, where not only the resilient element but also further axially displaceable components can be provided between the inner race of the first bearing and the code disk.

In particular at least one spacer sleeve is provided between the resilient element and the inner race of the first bearing and extends cylindrically around the shaft. In addition or alternatively, one or more spacer rings can be provided at the appropriate location.

The necessary installation space can be created in this way to ensure sufficient distance between them depending on the type of first bearing and reading head. Alternatively, it is also possible to have the resilient element have a certain extension in the axial direction, thereby being able to provide this installation space on its own. The spacer sleeves can also ensure that the clamping force from the spacer sleeve is applied precisely to the inner race of the first bearing.

The shaft is advantageously configured as a hollow shaft, i.e. is provided with a cylindrical cavity in the radially inner region at least in some sections. The cylindrical cavity provides in particular a mounting bush. At least one threaded bore which extends in the radial direction can be provided in the shaft in the region of the mounting bush and into which a screw can be introduced to attach a component in the mounting bush. Alternatively, components can be attached in the mounting bush using a locking pin or other attachment elements.

The configuration as a hollow shaft allows the shaft to be connected to an external component in a simple manner, for example a further shaft, the rotation of which is to be detected by the rotary encoder. Due to the hollow shaft, the radius of the inner opening of the code disk is comparatively large, so that there are high demands on the precision and operational reliability of the attachment of the code disk However, they are fulfilled by the configuration according to the invention.

The configuration according to the invention enables in particular a large inner diameter of the hollow shaft to be achieved, or that the housing can be configured relatively flat relative to this large inner diameter. In particular, an inner diameter of the hollow shaft can be achieved which in the axial direction has at least half the height of the housing, is advantageously even greater than the extension of the housing in the axial direction.

In one embodiment, the abutment for the code disk is provided by a shoulder in the shaft. This shoulder is provided in particular by changing the diameter of the shaft, advantageously with an abutment surface that is normal to the axial direction. The position of the code disk relative to the shaft can then be affixed with the utmost precision.

In a further embodiment, it is also possible that the abutment is a spacer ring which is arranged in particular on a shoulder in the shaft. This enables greater flexibility in the axial positioning of the code disk, which can be particularly advantageous if several different versions of the rotary encoder are to be manufactured with identical parts. The spacer sleeve or the spacer ring is configured in such a way that the clamping force does not cause any deformation of the spacer ring in the axial direction or that this deformation remains below the tolerance limit, respectively.

In one embodiment, the shaft is mounted with the first bearing as a radial bearing in a housing upper part of the housing, and on the oppositely disposed side with a second bearing as an axial bearing in a housing lower part. Precise axial positioning of the code disk is then made possible by way of the axial bearing and the abutment that is precisely affixed in the axial direction as a result. The radial bearing is advantageously configured such that it can transmit at least the axial clamping force to the housing upper part.

In particular, the configuration with the second bearing as a purely axial bearing makes it possible that no continuous shaft is necessary. The housing can be completely closed with the housing lower part. In addition, a shaft machined from only one side can be used.

The second bearing can advantageously be configured as a sliding bearing in the form of a thrust washer protruding from a recess in the housing lower part. Provided between the thrust washer and the housing lower part can be a thin metal washer, for example, a steel disk, as a sliding partner of the thrust washer. The metal disk can be attached to the lower part of the housing by adhesive bonding. A corresponding bearing configuration is also possible for the first bearing. This enables an extremely compact and easy-to-assemble configuration of the rotary encoder.

The first bearing can be in particular a sliding bearing for the shaft in the housing upper part, where the clamping force is introduced into the sliding bearing through a spacer sleeve. Alternatively, a rolling bearing can also be provided for the first bearing at this location.

In one embodiment, the reading head is arranged between the housing upper part and the housing lower part, in particular in direct contact with the housing upper and lower part. Provided on the housing lower part and/or on the housing upper part can be positioning pins which enable the reading head to be attached in a defined position.

However, it is also possible that the housing lower part or the housing upper part is omitted and the correspondingly configured rotary encoder is mounted on a mounting surface which provides the respective closure of the housing and a bearing side or a bearing seat, respectively. An even more compact configuration of the rotary encoder can thus be made possible.

In one embodiment, a flange is provided at one end of the shaft, where the flange is mounted with respect to the housing by way of an axial bearing, in particular the second bearing, and where the rear side of the flange provides the abutment. The flange can assume two advantageous functions as a dual function. In addition, such a configuration keeps the installation height low in the axial direction.

The resilient element is advantageously an annular or cylindrical elastomer element, in particular made of rubber or natural rubber or made of a synthetic elastomer such as silicone. For example, foam rubber, i.e. closed-cell elastic foam material can be used. The resilient element can be provided in particular in the form of a sealing ring.

Alternatively, the resilient element can be made of metal, in which case the elasticity is primarily determined by the geometry of the resilient element. For example, thin flat washers or shoulder washers made of metal can be used, which are elastically deformed via a shoulder in the shaft and can thereby apply a preload. Furthermore, compression springs made of metal can be used as the resilient element, either a large compression spring which extends about the circumference of the shaft or several small compression springs which are arranged along the circumference of the shaft. In particular, one or more coil springs can be used.

The resilient element, the code disk and/or the abutment can be configured at least in sections having a roughened surface in order to ensure that the position of the code disk is affixed precisely by frictional forces. It is possible that the resilient element is provided with a double-sided adhesive surface in order to ensure better positioning. Nevertheless, the actual fixation of the resilient element is effected by the clamping force, i.e. only a relatively thin adhesive surface is necessary and, in addition, there is no need to wait for curing since the clamping force ensures that the position of the resilient element is affixed. For example, the resilient element can be a double-sided adhesive foam rubber ring or a flat foam rubber washer. It is also possible to provide several resilient elements consecutively in the axial direction in order to obtain the desired resilience for generating the clamping force by combining them. This can be particularly advantageous if several different variants of the rotary encoder are manufactured that have different overall lengths or require different clamping forces.

The resilient element is advantageously a disk spring or finger spring, in the central opening of which the shaft is arranged. A high clamping force can be enabled in a very compact space using the disk spring or the finger spring. The disk spring or finger spring is made in particular of metal, where it can alternatively or additionally be made of polymer material.

The first and/or the second bearing can be configured as an axial bearing and/or a radial bearing. In particular, the first and/or the second bearings can be configured as rolling bearings, for example, as deep groove ball bearings, axial rolling bearings, axial needle bearings, angular ball bearings, conic bearings or cylinder bearings. Deep groove ball bearings or thin section bearings can be particularly advantageous. The races of the rolling bearings can be formed integrally by the housing and/or by the shaft, depending on the material of the housing and the shaft, respectively. Alternatively, ordinary races can be used as an integral part of the bearing.

The first and/or the second bearing, however, can also advantageously be configured as a sliding bearing or thrust washer made of plastic, ceramic, metal, in particular sintered bronze, or similar sliding materials. The sliding bearing surfaces can be provided by separate elements on the shaft and in the housing. Alternatively, the housing and/or the shaft can be made of suitable material at least in sections so that these elements can be employed directly as sliding bearings.

The invention further provides a method for assembling a rotary encoder comprising the following steps which can be carried out in this, in reverse, or any order, namely i) providing a housing lower part with a lower bearing, ii) inserting a shaft into the housing lower part, iii) arranging a code disk and a resilient element on the shaft, and iv) arranging and attaching a housing upper part with an upper bearing on/to the housing lower part so that the shaft is mounted by the upper bearing and the lower bearing, and a clamping force is applied by the upper bearing via the resilient element so that the code disk is pressed against an abutment on the shaft.

The shaft can be introduced into the housing lower part before or after the code disk and the resilient element have been arranged on the shaft. The housing upper part and/or the housing lower part can be provided with an opening which enables a connection of an external component to the shaft.

The invention provides a further method for assembling a rotary encoder in which a housing lower part is provided with a lower bearing; a code disk, a resilient element, and an upper bearing are arranged on a shaft; the shaft is inserted into a housing upper part; and the housing upper part is arranged on and attached to the housing lower part, so that the shaft is mounted by the upper bearing and the lower bearing, and a clamping force is applied by the upper bearing via the resilient element so that the code disk is pressed against an abutment on the shaft.

The resilient element clamping the code disk according to the invention is advantageous in terms of the installation effort and positioning precision. In an advantageous embodiment, the resilient element can additionally determine the bearing preload force so that two relevant forces in the system are thereby brought into harmony, namely the preload force in the axial direction for the bearings and the clamping force for the code disk.

The invention is used in particular in a rotary encoder which is closed at least in part by the housing and which can be installed in a preassembled manner. For this reason, the precision of the arrangement of the code disk starting from the assembly must be ensured.

With the aforementioned closed rotary encoder, however, fewer steps are necessary when installing the rotary encoder at the actual place of employment, since the code disk is protected from fouling and mechanical damage in the preassembled housing.

The invention provides an advantageous further development, since the rotary encoder can be structured extremely flat in the axial direction and nevertheless ensure good protection and precise fixation of the code disk. The rotary encoder according to the invention enables in particular a compact, closed assembly and thereby provides a high level of reliability with regard to concentricity. In addition, good protection against fouling can be achieved.

Despite the compact configuration in the axial direction, it is possible in particular by way of the hollow shaft to attach the rotary encoder according to the invention to shafts having a large diameter. Due to the possible large diameter of the code disk, the code disk can be subdivided with many code elements, which enables a high resolution.

The rotary encoder according to the invention can be installed in a simple manner without the code disk having to be further aligned. In addition, simple integration into other assemblies is possible without the measuring sensors being damaged or fouled. The rotary encoder can be configured as an incremental encoder or as an absolute encoder.

The code disk is clamped and thereby affixed with the aid of the resilient element which is configured in particular in the form of a tolerance compensation and clamping element. The position of the code disk is thereby affixed by the fixation. This can take place at the same time as preloading the bearing, where in particular the preload force of the bearing corresponds to the clamping force. In any case, exact and tilt-free positioning of the code disk is achieved in this way.

The housing and/or the shaft can be made in particular of aluminum. In this case, however, it is advantageous to provide at least thrust washers, advantageously sliding bearings or rolling bearings. Alternatively, the shaft and/or the housing can also be made directly from materials that have good sliding properties, whereby direct sliding mounting of the shaft in the housing is possible. For example, steel or bronze, but also a polymer material can be used for this purpose.

According to the invention, a rotary encoder is further provided with a shaft that comprises an abutment for the direct or indirect attachment of a code disk, where the shaft is supported by a purely axial bearing on one side of the abutment and a radial bearing on the other side of the abutment. As a result, no shaft fully extending through the housing is necessary, and the housing can be closed in a simple and flat manner, in particular on the side of the axial bearing. In addition, such a shaft only needs to be machined from one side in a lathe, since only one shoulder is necessary for the axial abutment for the code disk. Since only small tilting forces act on the rotary encoder according to the invention, the tilting resistance of the radial bearing is sufficient for most purposes.

BRIEF DESCRIPTION OF THE DRAWINGS

The invention shall be further described below in more detail with reference to preferred embodiments.

DETAILED DESCRIPTION

Figure 1:
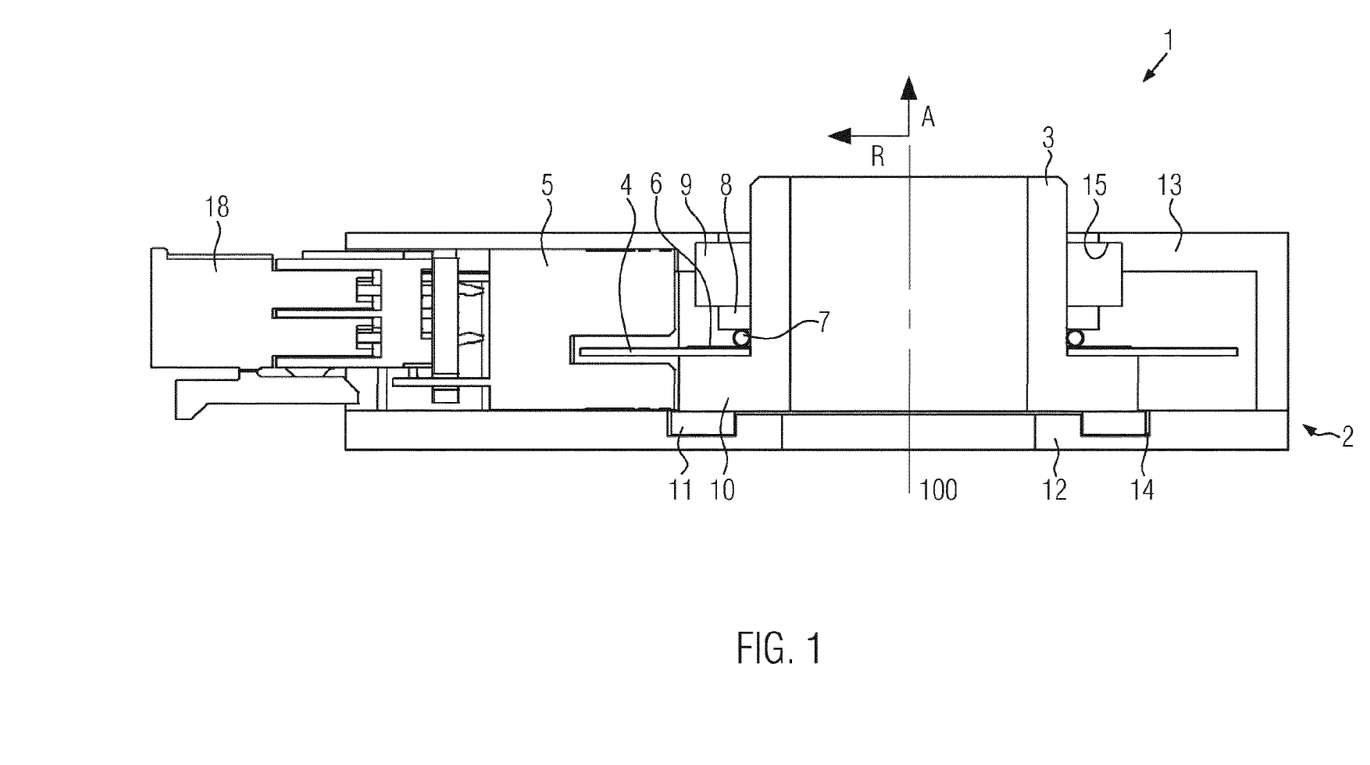
FIG. 1 shows a lateral sectional view of a first embodiment of a rotary encoder according to the invention.

The embodiment of a rotary encoder 1 according to the invention shown in FIG. 1 comprises a housing 2 in which a shaft 3 that is rotatable about an axis 100 is arranged. Shaft 3 extends in axial direction A. A code disk 4 is attached to shaft 3 and protrudes from shaft 3 in radial direction R. The rotation of code disk 4 can be detected by a reading head 5.

Code disk 4 is pressed by a clamping force in axial direction A against an abutment 6 which is provided by shaft 3. Abutment 6 is in particular a flat surface with a normal in axial direction A. Abutment 6 extends in particular uniformly around the entire circumference of shaft 3.

In the present embodiment, abutment 6 is configured as a flat surface in other embodiments, however, it is also possible for projections, such as pins or other shaped elements, to be provided which enable the code disk to be positioned precisely in the radial and/or the circumferential direction.

The clamping force acting in axial direction A for clamping code disk 4 on abutment 6 is provided or defined by a resilient element 7 which, in the present embodiment, is arranged directly on code disk 4. Resilient element 7 is configured as an O-ring made of an elastomer material. A spacer sleeve 8 is provided in axial direction A above resilient element 7. Spacer sleeve 8 can have different lengths in the axial direction, but can also be omitted entirely in some embodiments.

A first bearing 9 is arranged in axial direction A above spacer sleeve 8 and is part of the bearing of shaft 3 in housing 2. First bearing 9 is able to transmit the clamping force in axial direction A onto housing 2. The clamping force is determined in particular by the installation height in the housing, the position of the abutment on shaft 3, the axial length of resilient element 7 as well as first bearing 9 and possibly spacer sleeve 8, as well as by the resilience or compressibility of resilient element 7.

In the present embodiment, abutment 6 is provided by a flange 10 at the end of shaft 3. The shaft can then be produced in just one turning process, without the need for a turning process on the end side of flange 10. The inner bore of shaft 3, which is configured as a hollow shaft, can also be bored in a turning process.

Flange 10 is also used to support shaft 3 relative to housing 2 by way of a second bearing 11 in the form of an axial bearing. Second bearing 11 is configured in particular in the form of a thrust washer.

Housing 2 comprises a housing lower part 12 and a housing upper part 13, where housing parts 12, 13 are each provided with an opening so that a connection to an external component can be established from both sides of shaft 3. However, only one opening in housing lower part 12 or in housing upper part 13 can also be provided. A bearing seat in the form of an annular groove 14 for receiving second bearing 11 is advantageously provided in the housing lower part.

Otherwise, housing lower part 12 is configured to be substantially flat. Housing upper part 13, on the other hand, is pot-shaped so that the components of rotary encoder 1 contained therein, in particular shaft 3, code disk 4, and reading head 5 are protected from external influences, in particular dust or dirt and mechanical damage.

Provided in housing upper part 13 is a bearing seat 15 in which first bearing 9 is received. Since the distance between bearing seats 14 and 15 is defined by housing 2, the clamping force acting upon code disk 4 with fully assembled housing 2 can be precisely predetermined by appropriate selection bearings 9, 11, resilient element 7, and optionally a spacer sleeve 8.

In one embodiment of rotary encoder 1 according to the invention, housing lower part 12 can be omitted and rotary encoder 1 can be screwed directly onto an attachment surface on which in particular a surface serving as a thrust ring or a bearing seat for second bearing 11 is provided.

Housing lower part 12 and housing upper part 13 are connected to one another by screwing, clamping, adhesive bonding or by clip elements, so that closed housing 2 is created. Seals are provided between housing 2 and shaft 3 and between housing parts 12, 13 and in other potential gaps in the housing, so that housing 2 is protected against liquids and dust. The seals can be part of the rolling bearings provided.

The method for assembling rotary encoder 1 can be explained by way of example using FIG. 1: Housing lower part 12 is first provided, into which second bearing 11 is inserted. Shaft 3 is arranged in second bearing 11. Code disk 4, then resilient element 7, spacer sleeve 8, and then first bearing 9 are pushed onto shaft 3 up to abutment 6. Reading head 5 is arranged on housing lower part 12. Housing upper part 13 is then mounted and connected to housing lower part 12, in particular screwed on. As a result, a defined distance is specified between bearings 9, 11, and resilient element 7 is compressed by a predetermined distance, whereby a predetermined bearing preload force or clamping force is generated for code disk 4.

Alternatively, the method for assembling rotary encoder 1 can be carried out as follows: Code disk 4, resilient element 7, spacer sleeve 8, and first bearing 9 are first pushed onto shaft 3 up to abutment 6. Reading head 5 is inserted into housing upper part 13. Then shaft 3 with first bearing 9 is inserted into housing upper part 13 into bearing seat 15. At the same time, code disk 4 is pushed into reading head 5. Second bearing 11 is thereafter inserted into bearing seat 14 of housing lower part 12. Housing upper part 13 is then mounted and connected to housing lower part 12, in particular screwed on. As a result, a defined distance is specified between bearings 9, 11, and resilient element 7 is compressed by a predetermined distance, whereby a predetermined bearing preload force or clamping force is generated for code disk 4.

As an alternative, it is also possible, for example, to assemble in the reverse order by first arranging bearing 9, spacer sleeve 8, resilient element 7, and code disk 4 in housing upper part 13, and to then insert shaft 3 into these components. Second bearing 11 and housing lower part 12 are thereafter brought into position and housing parts 12, 13 are connected.

As a further alternative, bearing 9 is pressed onto housing upper part 13. Code disk 4, resilient element 7, and spacer sleeve 8 are placed onto shaft 3. Then shaft 3 is joined together with reading head 5 on bearing 9 and thereby housing upper part 13. Second bearing 11 and housing lower part 12 are thereafter brought into position and housing parts 12, 13 are connected.

Figure 2:
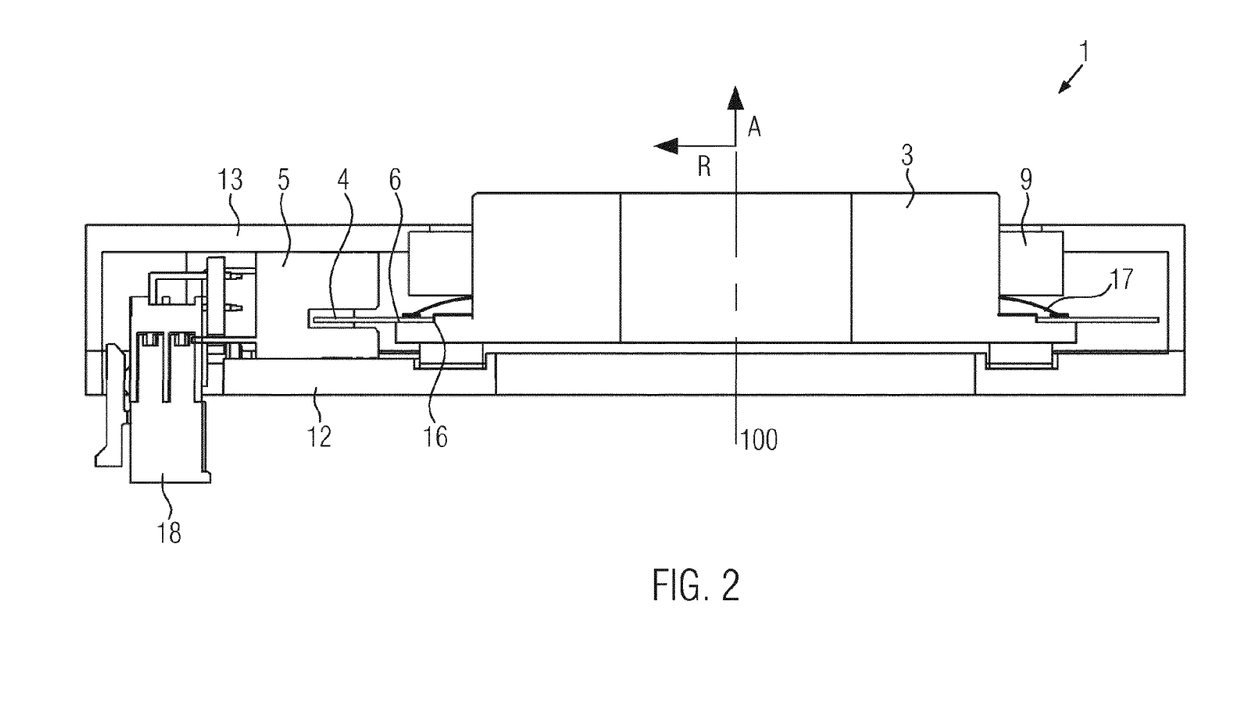
FIG. 2 shows a lateral sectional view of a second embodiment of a rotary encoder according to the invention.

Further embodiments of rotary encoders 1 according to the invention are shown in FIGS. 2 to 5, where mainly the differences to the first embodiment shall be explained below:

In the embodiment according to FIG. 2, abutment 6 comprises a positioning element 16 in the form of a circumferential projection, whereby the inner opening of code disk 4 can be selected and centered decoupled from the bearing or shaft diameter.

In addition to or independently thereof, a resilient element 17 in the form of a disk spring is provided which applies a resilient clamping force in axial direction A directly between first bearing 9 and code disk 4. While plug connection 18 of reading head 5 in the first embodiment according to FIG. 1 protrudes laterally outwardly between housing parts 12 and 13, it is directed downwardly through an opening in housing lower part 12 in the embodiment according to FIG. 2. Overall, the second embodiment according to FIG. 2 results in a compact configuration in the axial direction, although a high clamping force can still be achieved due to the use of resilient element 17 in the form of the disk spring.

Figure 3:
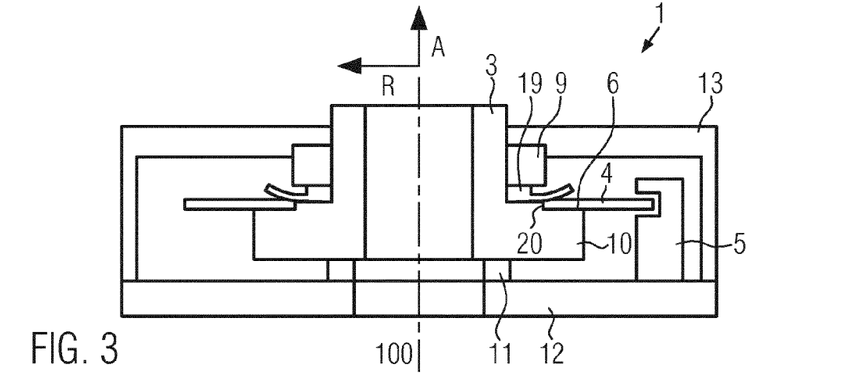
FIG. 3 shows a lateral sectional view of a third embodiment of a rotary encoder according to the invention.

FIG. 3 shows a further embodiment of a rotary encoder according to the invention, where a resilient element 19 in the form of a shoulder disk is there provided which is clamped at its radially inner end between first bearing 9 and flange 10 formed integrally with shaft 3. The radially outer end of the shoulder plate is resiliently deformed in such a way that it provides the clamping force for affixing code disk 4. In this embodiment, the clamping force for code disk 4 is independent of the preload force of bearings 9, 11. In particular, resilient element 19 in the form of the shoulder disk is made of a metallic material. The shoulder disk is at least twice as thick in its inner region as in its radially outer region.

Instead of a shoulder disk, only a flat washer, i.e. a flat element without a shoulder, can be provided as the resilient element and apply a corresponding clamping force upon code disk 4 by elastic deformation. A step 20 can advantageously be provided in flange 10 radially within abutment 6 in order to reduce the necessary deformation of the resilient element and to center code disk 4. First bearing 9 is advantageously a sliding bearing. It can then be prevented that the outer race of a rolling bearing comes into undesired frictional contact with resilient element 19, even with a large diameter of resilient element 19 in the form of a shoulder disk or a flat washer.

Figure 4:
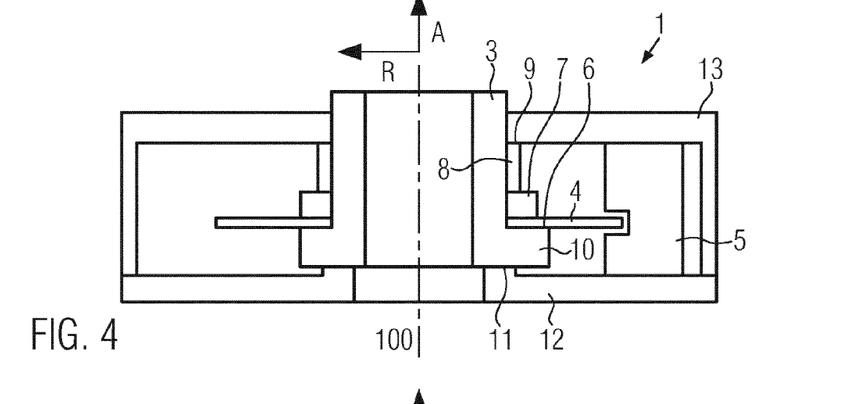
FIG. 4 shows a lateral sectional view of a fourth embodiment of a rotary encoder according to the invention.

In the further embodiment of rotary encoder 1 of the invention according to FIG. 4, bearings 9, 11 are each provided directly by sliding surfaces in housing 2. Flange 10 of shaft 3 runs directly on a sliding surface of housing lower part 12, and spacer sleeve 8 runs directly on a sliding surface of housing upper part 13. A resilient element 7 is again provided between spacer sleeve 8 and code disk 4 and causes the bearing force in axial direction A and accordingly the clamping force for code disk 4.

Figure 5:
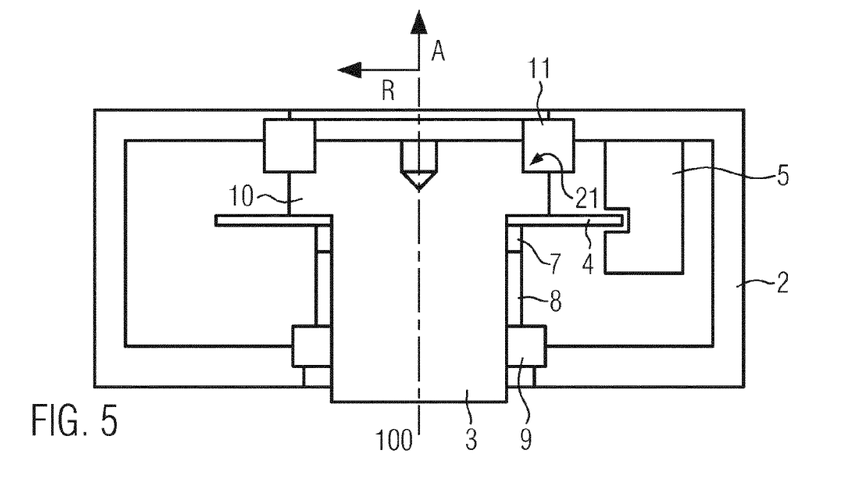
FIG. 5 shows a lateral sectional view of a fifth embodiment of a rotary encoder according to the invention.

In the embodiment according to FIG. 5, shaft 3 is supported by first bearing 9 and second bearing 11, each of which is configured as a rolling bearing. For this purpose, shaft 3 has a flange region 21 that is stepped back in which second bearing 11 is arranged. The clamping force for affixing code disk 4 is again applied to code disk 4 by housing 2 via first bearing 9 and spacer sleeve 8 as well as resilient element 7.

Alternatively, second bearing 11 can also be arranged on a locking ring which is arranged in flange region 21. For this purpose, second bearing 11 can have an inner diameter which corresponds to the outer diameter of flange 10.

The invention claimed is:
1. A rotary encoder (1), comprising:
a housing (2);
a shaft (3);
a code disk (4) which is attached to said shaft (3); and
a reading head (5) which is configured to detect the rotation of said code disk (4);
wherein said code disk (4) is affixed in an axial position on one axial side by an abutment (6) on said shaft (3); and
a resilient element (7, 17, 19) is arranged on another axial side of said code disk (4) and provides a clamping force with which said code disk (4) is pressed against said abutment (6) wherein said resilient element (7) is an annular or cylindrical elastomer element.

2. The rotary encoder according to claim 1, wherein said resilient element (7, 17, 19) extends in a circumferential direction around said shaft (3).

3. The rotary encoder according to claim 1, further comprising a first bearing (9) of said shaft (3) arranged such that the clamping force is introduced via said resilient element (7, 17) and said first bearing (9) into said housing (2).

4. The rotary encoder according to claim 3, further comprising a spacer sleeve (8) between said resilient element (7, 17) and said first bearing (9) which extends cylindrically around said shaft (3).

5. The rotary encoder according to claim 1, wherein said shaft (3) is a hollow shaft.

6. The rotary encoder according to claim 1, wherein said abutment (6) is provided by a shoulder in said shaft (3).

7. The rotary encoder according to claim 1, wherein said abutment (6) is a spacer ring which is arranged on a shoulder in said shaft (3).

8. The rotary encoder according to claim 1, wherein said shaft (3) is mounted with respect to a housing upper part (13) of said housing (2) with a first bearing (9) configured as a radial bearing, and wherein said shaft (3) is mounted with respect to a housing lower part (12) of said housing (2) on an oppositely disposed side of said shaft (3) with a second bearing (11) configured as an axial bearing.

9. The rotary encoder according to claim 8, wherein said second bearing (11) is configured as a sliding bearing in the form of a thrust washer protruding from a bearing seat (14) in said housing lower part (12).

10. The rotary encoder according to claim 8, wherein said first bearing (9) is a sliding bearing of said shaft (3) in said housing upper part (13), and wherein the clamping force is introduced into said sliding bearing through a spacer sleeve (8).

11. The rotary encoder according to claim 8, wherein said reading head (5) is arranged between said housing upper part (13) and said housing lower part (12).

12. The rotary encoder according to claim 1, further comprising a flange (10) at one end of said shaft (3), wherein said flange (10) is mounted with respect to said housing (2) by way of an axial bearing, and wherein a rear side of said flange (10) provides said abutment (3).

13. A rotary encoder, comprising:
  a housing (2);
  a shaft (3);
  a code disk (4) which is attached to said shaft (3); and
  a reading head (5) which is configured to detect the rotation of said code disk (4);
  wherein said code disk (4) is affixed in an axial position on one axial side by an abutment (6) on said shaft (3); and
  a resilient element (7, 17, 19) is arranged on another axial side of said code disk and provides a clamping force with which said code disk (4) is pressed against said abutment (6), wherein said resilient element (17, 19) is a disk spring or finger spring having a central opening therein, wherein said shaft (3) is arranged in said central opening.

14. A method for assembling a rotary encoder (1) comprising the steps of:
  providing a housing lower part (12) with a lower bearing (11);
  arranging a code disk (4), a resilient element (7, 17, 19) comprising one of an annular elastomer element, a cylindrical elastomer element, a disk spring, or a finger spring, and an upper bearing (9) on a shaft (3);
  introducing said shaft (3) into a housing upper part (13);
  arranging and attaching said housing upper part (13) to said housing lower part (12) so that said shaft (3) is mounted by said upper bearing (9) and said lower bearing (11), and a clamping force is applied by said upper bearing (9) via said resilient element (7, 17, 19) so that said code disk (4) is pressed against an abutment (6) on said shaft (3).

* * * * *